Patented Oct. 24, 1950

2,527,390

UNITED STATES PATENT OFFICE 2,527,390

CASTING SLIP

Emil Blaha, Cheltenham, Pa., assignor to Selas Corporation of America, Philadelphia, Pa., a corporation of Pennsylvania No Drawing. Application September 20, 1945, Serial No. 617,665

2 Claims. (Cl. 106—44)

This invention relates to casting slips, and is especially concerned with slips for producing molded shapes by casting.

It has usually been the practice to produce molded shapes of subdivided material in dies under extremely high pressures. This is especially true in molding shapes of subdivided materials, such as, for example, refractory and ceramic materials.

When shapes of subdivided material are molded in dies, the compressing and compacting of the material under high pressure, often accompanied by the application of heat, imparts to the shapes such physical characteristics that each molded article is usually capable of supporting its own shape, that is, the shapes are self-sustaining and possess sufficient strength to be handled. In certain instances where the molded shapes are further processed, such as, for example, the firing at elevated temperatures of molded shapes of refractory and ceramic materials in a dry state, a small quantity of a temporary bonding agent is often mixed with the subdivided material to give the molded shapes the desired "green strength" preparatory to the firing of such shapes.

When dies are employed to mold shapes of subdivided material which is highly abrasive, such as, for example, silicon carbide, the dies wear down rapidly with such use. Further, the cost of dies becomes extremely expensive when only a few pieces of a particular molded shape are required.

According to the present invention an improved casting slip is provided for producing molded shapes of subdivided material by casting, thereby eliminating the expense of dies and equipment required to produce the extremely high pressures necessary to compress the material in the dies. The casting slip of the invention involves the use of a cohering substance which dissolves in a liquid in one temperature range and becomes stiff and sets upon change of temperature from such temperature range. A subdivided material of which molded shapes are to be produced, and which is inert with respect to the liquid and the cohering substance, is mixed with the liquid in which the substance is dissolved. In other words, the subdivided material is mixed with the other components of the casting slip when the cohering substance is at a temperature at which the latter is capable of dissolving in the liquid. Since the subdivided material is inert with respect to the cohering substance and the liquid, no chemical reaction takes place between the components of the mixture and the particles of subdivided material remain suspended in the mixture.

The relative proportions of the subdivided material, liquid and cohering substance forming the casting slip are preferably such that a slurry of the mixture is produced having such fluidity that a shape can be readily cast by simply pouring the mixture into a mold. After the molded shape is formed it is subjected to change of temperature from the particular temperature conditions present when the casting slip was produced, such change of temperature being sufficient to cause the cohering substance to stiffen and effect setting of the molded shape. The proportion of stiffening substance in the casting slip is adequate for the molded shape, when setting thereof occurs, to form a self-sustaining mass which is firmly held together and capable of being handled.

The molded shape, which still contains the liquid when it is caused to set, is removed from the mold and substantially complete removal of the liquid is then effected. Such removal of liquid is accomplished by evaporation without adversely affecting the set subdivided material; that is, the removal of the liquid from the set shapes is accomplished by gradual surface evaporation and the rapid formation of gas bubbles resulting from boiling of the liquid is avoided which would tend to cause the particles of subdivided material to spread apart.

When the molded shapes are produced from the casting slip and caused to set, the shapes still contain the liquid in which the cohering substance was initially dissolved; and, while the proportion of the cohering substance employed in the casting slip mix is adequate to produce molded shapes which are self-sustaining when setting thereof occurs, the shapes at this stage are actually semi-rigid. However, when the liquid is removed from the molded shapes and the only components thereof are the subdivided material and the cohering substance, the molded shapes become completely rigid and possess physical characteristics comparable to those possessed by molded shapes produced in dies under extremely high pressures and sometimes involving the application of heat.

When the rigid molded shapes require further processing, as is the case when shapes of subdivided refractory material are formed and such shapes must be fired at elevated temperatures to effect hardening and impart the desired strength to the shapes, the molded shapes produced from the casting slip of the invention readily respond to such further processing. In such case the cohering substance is of such a character that it is burned out during the firing step to produce refractory shapes in which the only component thereof is the subdivided material which may be the refractory material alone or a mixture thereof with other materials, such as a bonding agent, for example, to produce a desired end product.

In other instances the rigid molded shapes produced from the casting slip of the invention may be in condition for immediate use without further processing, and in other cases a surface treatment of the shapes may be desirable either to provide a protective coating or produce a particular surface design or finish. In each case, any subsequent processing of the molded shapes that may be necessary will depend, of course, upon the subdivided material employed in the mixture to produce the casting slip of the invention.

The cohering substances that I have found to be particularly useful to produce the casting slip of the invention are gelatin and albumin because each of these substances readily dissolves or goes into solution in liquids in one temperature range and setting and stiffening thereof is effected simply by a change of temperature from such temperature range. The liquid suitable for producing a solution of the cohering substances just mentioned may include, for example, water and aqueous solutions of alcohols, such as methyl alcohol.

Casting slips may be produced in accordance with the invention of any subdivided material or mixture of materials and is especially applicable to those materials which are essentially non-plastic in character. By way of example and without limitation, the casting slip may be formed of subdivided materials including refractories, such as, for example, silicon carbide, aluminum oxide, aluminum silicate, zirconium silicate, zirconium oxide, magnesium oxide and beryllium oxide; and of silica, calcined clay products, calcined porcelain materials, carbon, comminuted or powdered metals and glass and synthetic resin products.

When gelatin is employed as the cohering substance for the casting slip, it may be used either in powdered or flaked form. In powdered form the gelatin may be thoroughly mixed with the subdivided material in a dry state and the peptizing liquid is then added to the mixture. As just mentioned, such peptizing liquid may be water or an aqueous solution of an alcohol, such as methyl alcohol, for example. In each specific case the peptizing liquid selected should be inert with respect to the subdivided material and I have found water most suitable for this reason.

The mixture of the subdivided material, cohering substance and peptizing liquid is then heated sufficiently to cause the gelatin to melt in the liquid and form a colloidal solution in which the particles of subdivided material are suspended. In practice the forming of the solution is facilitated by heating the peptizing liquid to a temperature just below the boiling point of the liquid, and, when water is employed as the peptizing liquid, the mixture is heated to a temperature in the neighborhood of 205° F. when the boiling point is 212° F.

When flaked gelatin is employed, it is desirable first to swell the gelatin in the peptizing liquid at ordinary room temperatures to form a colloidal solution upon the subsequent application of heat thereto, and then thoroughly mix the subdivided material and such solution.

The relative proportions of subdivided material, gelatin and liquid in the mixture are such that a slurry is produced when the gelatin is in solution in the liquid. The slurry should be of such viscosity that plastic flow of the casting slip is obtained to facilitate the casting of molded shapes.

The molds for casting shapes with the casting slip of the invention are preferably non-absorbent and may be formed of any suitable material, such as brass or aluminum, for example. After a shape is cast in a mold, the shape is then cooled to cause the gelatin to set and stiffen. This may be accomplished by immersing the mold in a cooling liquid bath, such as water, for example, whereby the cast shape is cooled to a temperature of at least 60° F. when water is employed as the peptizing liquid. However, the cast shape may be cooled slowly to an even lower temperature so long as freezing of the peptizing liquid is avoided. When rapid cooling of the cast shape is effected, as by the quick freeze methods employed to freeze food products and the like, the setting of the gelatin is accomplished so rapidly that only minute ice crystals are produced which do not adversely affect the set subdivided material when the shape is subsequently permitted to thaw gradually to a temperature below that at which melting and liquefying of the gelatin can again take place.

The relative proportions of subdivided material, gelatin and peptizing liquid are such that, besides producing a slurry of the character just described to obtain plastic flow for casting, the resulting cast shape will set upon cooling and stiffening of the gelatin to produce a self-sustaining mass which is firmly held together and which, although semi-rigid in character, can be safely removed from the mold and handled with reasonable care without breaking.

The cast shape removed from its mold is semi-rigid due to the peptizing liquid held therein. By placing the semi-rigid cast shape on a shelf or rack in an open room and keeping the shape at a temperature at least as low as 60° F. and above the freezing temperature of 32° F., when water is employed as the peptizing liquid, gradual evaporation of the water from the shape takes place into the atmosphere, whereby the gelatin becomes dehydrated and anhydrous and is converted into a solid.

With evaporation of the liquid from the cast shape it is converted from a semi-rigid to a completely rigid mass. Further, since the shape is substantially depleted of liquid, the gelatin cannot melt and will remain in the shape in a solid state at room temperatures and above a temperature of 60° F. to which the cast shape must initially be cooled, when water is employed as the peptizing liquid, to cause setting and stiffening of the gelatin. The evaporation of the liquid from the cast shape takes place by what may be referred to as gradual surface evaporation without adversely affecting the set subdivided material.

When albumin is employed as the cohering substance it is thoroughly mixed in a dry state with the selected subdivided material and a liquid, such as water or an aqueous solution of an alcohol, is added in which the albumin dissolves. As is the case when gelatin is employed as the cohering substance, the liquid used should be inert with respect to the subdivided material and for this reason I prefer to dissolve the albumin in water. The mixture of subdivided material, albumin and water is formed at ordinary room temperatures of 60 to 80° F. and the proportions of these components of the casting slip are such that a slurry is produced of such viscosity that plastic flow is obtained to facilitate the casting of molded shapes.

After a molded shape is cast in a mold, the shape is then heated to cause the albumin to set and stiffen. This may be accomplished by immersing the mold in a heating liquid bath, such as water, for example. While stiffening of the albumin may be effected by heating the cast shape to a minimum temperature in the neighborhood of 175 to 200° F. when the cohering substance is dissolved in water, I prefer to heat the cast shape to a temperature of about 205° F. and just below the boiling point of the water to promote rapid setting of the albumin.

The relative proportions of subdivided material, albumin and liquid in which the albumin is dissolved are such that, besides producing a slurry of the character described above, the shape cast therefrom will set upon stiffening of the albumin to produce a self-sustaining mass which is firmly held together and which, although semi-rigid in character, can be safely removed from the mold and handled with reasonable care without breaking.

To convert the cast shape from a semi-rigid to a completely rigid mass, the liquid held in the shape may be removed therefrom by placing the shape in an open space at ordinary room temperature or by heating. When water is used to dissolve the albumin, the semi-rigid cast shape may be heated to a temperature just below the boiling point of water, such as 205° F., for example, when the boiling point is 212° F., whereby gradual evaporation of the liquid is effected and the forming of steam and bubbling is avoided which adversely affects the set subdivided material.

After setting of the albumin takes place it is insoluble in water and other liquids, such as aqueous solutions of alcohol, and the substantially complete removal of the liquid in which the albumin was originally dissolved produces a rigid cast shape of the subdivided material having the subdivided material and albumin as the only components thereof. Such cast shapes in this dry condition can be safely handled at ordinary room temperature and even when subjected to heating.

Hence, when either gelatin or albumin are employed as the cohering substance for the casting slip, the substance is dissolved or goes into solution in the liquid in one temperature range and sets upon a change in temperature from such temperature range. In the case of gelatin the casting slip mix is initially heated to an elevated temperature below the boiling point of the liquid to facilitate and promote the melting of the gelatin to form a colloidal solution. As the temperature of this colloidal solution decreases, partial coagulation of the gelatin takes place. However, through a definite temperature range complete setting and stiffening of the gelatin does not occur. When the gelatin is liquified in water, for example, partial or complete melting of the gelatin in the water occurs in a temperature range varying from about 70° F. to the boiling point of water. Complete setting and stiffening of the gelatin is effected only when the temperature of the gelatin-water mixture is reduced below 70° F. and preferably to about 60° F.

Likewise, albumin dissolves in liquids, such as water, for example, in a temperature range varying from above the freezing temperature of 32° F. to a temperature in the neighborhood of about 175° F. Setting and stiffening of the albumin begins to take place in the neighborhood of 175° to 200° F. and takes place more rapidly at the higher temperatures. Hence, shapes cast from the casting slip of the invention are preferably heated to a temperature of about 205° F. and just below the boiling point of 212° F. when water is used in the casting slip mix.

In regard to the proportion of cohering substance necessary to produce the casting slip mix, the only requirement to be satisfied is that, upon initial setting and stiffening of the substance, a semi-rigid cast shape is produced which forms a self-sustaining mass which is firmly held together. If a sufficient quantity of cohering substance is not employed in the casting slip mix, the cohering substance upon initial setting thereof will be too weak to hold the wet shape together, even when it is handled with reasonable care, and the shape will tend to fall apart.

I have found that when the subdivided material is finely ground, and in the neighborhood of about 200 mesh, the casting slip should be formed of about four parts by weight of gelatin or albumin and about 96 parts by weight of the subdivided material. A safe rule to follow, prior to adding the liquid or wetting agent, is to employ about four to ten parts of cohering substance in the combined mixture of subdivided material and the cohering substance. The proportion of cohering substance employed may be greater than ten parts by weight of the combined mixture of the subdivided material and cohering substance. I have found that in most instances the use of such higher amounts of cohering substance is not absolutely necessary and may be wasteful. However, higher proportions of the cohering substance than those just mentioned may be necessary when casting complicated shapes in order for the cohering substance to produce the necessary strength in places of the mold reached only with difficulty by the casting slip. The amount of liquid added to the mixture of cohering substance and subdivided material should, as explained above, be such that a slurry is produced having plastic flow to facilitate the casting of molded shapes.

While it has been stated above that the casting slip of the invention is especially applicable for casting molded shapes of subdivided material or a mixture of materials which are essentially non-plastic in character, it may sometimes be desirable to mix with such non-plastic materials a plastic material, such as clay, for example. When this is done the proportion of plastic material used should not be effective to hamper and adversely affect the drying ability of molded shapes when initial setting of the cohering substance is accomplished.

In certain instances, particularly when albumin is used as the cohering substance, a subdivided material may be used in the casting slip mix which is plastic rather than non-plastic in character. This is especially true, for example, in a casting slip mix including albumin, water and a subdivided material like ball clay and clay mixtures. However, even when plastic materials are used, the casting slip of the invention does not rely solely upon the physical characteristics of such materials to obtain plastic flow. Such plastic materials merely aid in maintaining uniform suspension of the particles of subdivided material which can be accomplished satisfactorily when the subdivided material is non-plastic in character by the cohering substance alone when it is dissolved or in solution and the casting slip mix is of the viscosity referred to above.

While both gelatin and albumin often do not require the use of an agent to maintain the subdivided material in suspension in the casting slip mix, and gelatin by itself possesses excellent suspending qualities, it may be desirable in particular instances to use a suspending agent or medium when albumin is used as the cohering substance. Such suspending agent may be ball clay or clay mixtures which have been referred to above, bentonite or organic materials like starch or flour. However, such suspension agents or materials, as explained above, merely aid in maintaining uniform suspension and are not relied upon completely to produce a casting slip mix of such viscosity that plastic flow obtains.

While the foregoing description fully describes the casting of molded shapes with the casting slip of the invention, I will set forth several examples with specific subdivided materials. In the examples given below, as well as in the description above, the dry materials are indicated in parts by weight. It will be noticed, however, that the parts by weight total 100 so that for purposes of the language used in the claims the parts by weight are percentages, and will be referred to as such.

Example 1

The following casting slip is made by intimately mixing parts by weight:

|  | Parts |
| --- | --- |
| Silicon carbide (20 to 300 mesh) | 93 |
| Gelatin powder | 7 |
| Water | 23 |

The subdivided silicon carbide of graduated particle sizes ranging from 20 to 300 mesh is intimately mixed in a dry state with the gelatin powder which is the cheapest commercially obtainable. The water is then added to the dry mixed components of the casting slip and the wet mixture then heated to a temperature just below the boiling point of the water and in the neighborhood of about 205° F. when the boiling temperature is 212° F. The slurry produced is of such viscosity that plastic flow is obtained for casting a molded shape.

The casting slip in which the gelatin is completely liquified or melted is then cast in a mold in which the silicon carbide particles remain thoroughly distributed and suspended in the water-gelatin solution. The mold is then cooled in a suitable water bath to cause the cast shape to cool to a temperature of about 60° F. When this occurs the cast shape sets and forms a semi-rigid mass due to stiffening and setting of the gelatin.

The semi-rigid cast shape of silicon carbide is then removed from its mold and allowed to dry in an open place in a room in which the air is relatively dry and at a temperature of from 40° to 60° F. Complete drying of the cast shape is readily effected in about twenty-four hours, the gradual evaporation of the water from the shape causing the latter to be converted from a semi-rigid to a completely rigid mass.

The silicon carbide shape thus produced may be further processed by firing at an elevated temperature to effect hardening thereof. When this is done the gelatin is burned out to produce a porous silicon carbide body.

Example 2

The following casting slip is made by intimately mixing parts by weight:

|  | Parts |
| --- | --- |
| Silicon carbide (20 to 300 mesh) | 83 |
| Comminuted ball clay | 10 |
| Albumin | 7 |
| Water | 23 |

The subdivided silicon carbide of graduated particle sizes ranging from 20 to 300 mesh and comminuted ball clay are intimately mixed in a dry state with powdered albumin. The dry mixed components of the casting slip are thoroughly mixed with the water at ordinary room temperature in the neighborhood of 70° F. to produce a slurry which is of such viscosity that a plastic flow is obtained to facilitate casting. The casting slip in which the albumin is completely dissolved is then cast in a mold in which the silicon carbide particles remain thoroughly distributed and suspended in the albumin solution, the suspension of the silicon carbide particles being aided by the ball clay which is dispersed in the solution. The mold is then heated in a hot water bath to heat the albumin solution to a temperature of about 205° F. when the boiling point of the water is about 212° F. When this occurs the cast shape forms a semi-rigid mass due to stiffening and setting of the albumin.

The semi-rigid cast shape of silicon carbide and clay is then removed from its mold and drying thereof may be effected by placing the cast shape in an open place at ordinary room temperatures. However, removal of the water from the cast shape may be speeded up by subjecting the cast shape to heating, as by warm air, to heat the cast shape to a temperature of about 205° F. to cause gradual surface evaporation of the water whereby the cast shape is converted from a semi-rigid to a completely rigid mass.

The silicon carbide shape thus produced may be further processed by firing at an elevated temperature to effect hardening thereof. When this is done the albumin is burned out to produce a porous silicon carbide body.

While specific examples have just been given illustrating the use of gelatin and albumin as cohering substances for casting slips in which silicon carbide particles are employed as the subdivided material, it should be understood that in the illustrations given any other suitable subdivided material may be substituted for the silicon carbide. The relative proportions given for the components of the casting slip enable most shapes to be cast therefrom without difficulty. However, for complicated shapes the proportion of cohering substance necessary may be greater, as explained above.

The subdivided material is inert not only with respect to the liquid or wetting agent but also with respect to the cohering substance. Hence, in the practice of the invention the semi-rigid cast shape initially produced in the mold is accomplished by a physical change of state of the cohering substance resulting solely upon a change of temperature from one temperature range which causes the cohering substance to set and stiffen. The set and stiffened cohering substance coats the particles of subdivided material and the semi-rigid cast shape initially produced is firmly held together by purely physical action. When the liquid in which the cohering substance is in solution or dissolved is evaporated from the initially cast shape, the latter becomes completely rigid. However, even in the completely rigid state of the cast shape, the action of the cohering substance on the subdivided material is purely physical.

In certain instances the casting slip mix may include components which react chemically to cause the cast shape to set. Such a casting procedure may be correlated with the practice of the invention in which some setting is effected by chemical reaction of components of the mix and in which the setting of the shape is effected predominantly by physical change of state of the cohering substance.

After the cast shape is initially produced in the mold and the liquid, such as water, for example, is removed from the shape, the layer of stiffened cohering substance physically adhering to the particles of subdivided material gradually becomes thinner with evaporation of the liquid. While this tends to produce voids, I have found that no rupture between the film of set or stiffened cohering substance and the surfaces of the particles of the subdivided material takes place, so that a completely rigid and self-sustaining mass is formed when the shape is substantially dry and all of the liquid is evaporated therefrom.

It will now be understood that an improved casting slip has been provided whereby cast shapes may be produced each having a uniform structure throughout its mass regardless of the configuration of the shape. Hence, in producing molded shapes with the casting slip of the invention difficult shapes may be cast as readily as simple shapes to provide end products of uniformly excellent quality.

While gelatin solutions have been employed in small amounts in dry refractory masses, the use of such gelatin solutions has been for the sole purpose of obtaining a temporary bond of the dry materials prior to molding the materials in dies under extremely high pressures. In practicing the invention much greater percentages of gelatin are used than heretofore for the purpose of producing a liquifying effect, and any temporary bond obtained by the gelatin is merely incidental. By using a higher percentage of gelatin than heretofore proposed, it is possible to produce casting slips capable of plastic flow, so that difficult shapes can be produced by casting and an improved end product obtained.

Although both gelatin and albumin have been found extremely satisfactory as cohering substances for casting slip mixes of the invention, albumin possesses certain definite advantages over gelatin. In the first place, albumin dissolves in a liquid, such as water, for example, at ordinary room temperatures while heating of gelatin is required to produce a gelatin-water solution. Secondly, during periods of hot weather, provision must be made for cooling gelatin to cause setting and stiffening while setting of albumin is accomplished simply by the application of heat at any season of the year. Further, albumin is thermo-setting, and, after it once stiffens, it always remains insoluble in water. On the other hand, gelatin is thermo-plastic and must be kept cool so long as water remains in the set or stiffened gelatin to avoid reconverting the gelatin back into a liquid state.

It may also be desirable to use as a cohering substance a mixture of gelatin and albumin. Such a mixture of gelatin and albumin possesses certain advantages not inherent in either of these substances alone. The combination of gelatin and albumin together as a cohering substance is possible because a combined solution of both of these substances may be formed in a single temperature range without causing stiffening of either one of the substances.

When both gelatin and albumin are used together as a cohering substance they may be used in the same or widely varying proportions in the casting slip mix. In the first example given above, for example, 3½ parts by weight of gelatin powder and 3½ parts by weight of albumin may be used in place of the gelatin alone. In such case the subdivided silicon carbide is intimately mixed with the gelatin powder and powdered albumin in a dry state and the water thereafter added to the dry mix.

The wet mixture is then heated to a temperature sufficiently high to cause melting and liquifying of the gelatin but insufficient to cause stiffening of the albumin which readily dissolves in the water at ordinary room temperatures. When water is used as the wetting agent, the wet mixture may be safely heated to a temperature in the neighborhood of 130° to 140° F. to cause melting of the gelatin and produce a slurry of such viscosity that plastic flow is obtained for casting. Since gelatin possesses excellent suspending qualities the gelatin promotes the suspension of the subdivided material, especially material which is non-plastic in character.

A molded shape is then cast from the slurry in a mold in which the subdivided material remains thoroughly distributed and suspended in the water-gelatin and albumin solutions. The mold and cast shape therein is heated to a temperature sufficiently high to cause the albumin to set and stiffen and effect partial setting of the cast shape. During such heating the gelatin-water solution is not affected and serves to keep the subdivided material properly suspended up to the very moment stiffening of the albumin takes place.

After stiffening of the albumin is accomplished, the mold is then cooled to a temperature sufficiently low to cause the gelatin to set and stiffen. When this occurs the cast shape is converted to a semi-rigid mass which is self-sustaining and capable of holding itself firmly together, thereby permitting the safe removal of the shape from the mold. The cast shape is then allowed to dry in an open place in a room at ordinary room temperature in which the air is relatively dry. The gradual evaporation of the water from the shape causes the latter to be converted from a semi-rigid to a completely rigid mass.

Since partial setting of the shape is effected by the albumin which always remains insoluble after it has once set, the final drying of the cast shape to remove liquid therefrom may be effected at temperatures at which melting of the gelatin may take place. This is so because, even though there may be a tendency for the gelatin to melt and liquify in the final drying of the shape, the albumin is capable of holding the cast shape together and prevent its collapse. As the drying of the shape progresses the gradual removal of liquid ultimately converts the gelatin to a solid state to produce a completely rigid cast shape.

The use of gelatin and albumin together as a cohering substance produces a single coating on the surfaces of the subdivided material when the final drying of the cast shape is accomplished. There is no physical separation nor stratification of the gelatin and albumin, and the physical action of the mixture on the surfaces of the subdivided material is the same as when either gelatin or albumin is used separately.

In the following claims the term "subdivided material" is intended to designate a single subdivided material or a mixture of subdivided or comminuted materials from which molded shapes are to be cast with a casting slip of the character hereinbefore described. Further, in the claims the term "cohering substance" is intended to designate a single substance or a mixture of substances each of which dissolves or goes into solution in a liquid in one temperature range and sets or stiffens upon a change of temperature from such temperature range. Moreover, the term "gelatin" includes not only gelatin as such but any substance containing gelatin in an impure state, such as glue, for example.

What is claimed is:

1. A casting slip comprising a mixture including dry, subdivided silicon carbide and ball clay, albumin and liquid in which the albumin is soluble, the quantity of albumin being between four and ten per cent by weight of the combined quantities of albumin and silicon carbide and ball clay when in a substantially dry condition, and the quantity of liquid being sufficient to produce a slurry of the mixture having plastic flow, said ball clay dispersing in the mixture and serving to promote suspension of the silicon carbide in the solution.

2. A casting slip consisting of a mixture of dry, subdivided silicon carbide, water and a solid cohering substance consisting of albumin which is soluble in the water in one temperature range and becomes stiff and sets upon increase in temperature from said temperature range, the quantity of albumin being between four and ten parts by weight in one hundred parts of the combined quantities of silicon carbide and albumin in a dry state, and the quantity of water being sufficient to produce a slurry of the mixture in said one temperature range having plastic flow.

EMIL BLAHA.

REFERENCES CITED

The following references are of record in the file of this patent:

UNITED STATES PATENTS

| Number | Name | Date |
|---|---|---|
| 1,540,509 | Williams | June 2, 1925 |
| 2,121,018 | Carter et al. | June 21, 1938 |
| 2,159,349 | Bennett | May 23, 1939 |
| 2,341,561 | Kinzie et al. | Feb. 15, 1944 |

FOREIGN PATENTS

| Number | Country | Date |
|---|---|---|
| 601,500 | Germany | 1934 |